United States Patent [19]
Nelle

[11] Patent Number: 5,511,321
[45] Date of Patent: Apr. 30, 1996

[54] LINEAR ENCODER

[75] Inventor: Günther Nelle, Bergen, Germany

[73] Assignee: Dr. Johannes Heidenhain GmbH, Traunreut, Germany

[21] Appl. No.: 507,741

[22] Filed: Jul. 26, 1995

Related U.S. Application Data

[63] Continuation of Ser. No. 264,538, Mar. 23, 1994, abandoned.

[30] Foreign Application Priority Data

Jun. 23, 1993 [DE] Germany ................. 43 20 728.6

[51] Int. Cl.⁶ ................................................ G01B 1/00
[52] U.S. Cl. ...................... 33/704; 33/702; 33/DIG. 19
[58] Field of Search ................... 33/704, 702, 703, 33/DIG. 19

[56] References Cited

U.S. PATENT DOCUMENTS

| | | | |
|---|---|---|---|
| 3,816,002 | 6/1974 | Wieg . | |
| 4,170,826 | 10/1979 | Holstein | 33/702 |
| 4,559,707 | 12/1985 | Oberhans | 33/702 |
| 4,593,471 | 6/1986 | Nelle | 33/702 |
| 4,912,856 | 4/1990 | Ernst | 33/702 |
| 4,982,508 | 1/1991 | Nelle et al. | 33/702 |
| 5,157,846 | 10/1992 | Fromme | 33/704 |
| 5,182,867 | 2/1993 | Nelle | 33/702 |

FOREIGN PATENT DOCUMENTS

| | | |
|---|---|---|
| 0118607 | 9/1984 | European Pat. Off. . |
| 0202630 | 11/1986 | European Pat. Off. . |
| 1176382 | 8/1964 | Germany . |

Primary Examiner—Christopher W. Fulton
Attorney, Agent, or Firm—Anderson Kill Olick & Oshinsky

[57] ABSTRACT

A linear encoder for measuring a relative position of two objects and including a scale having a coefficient of thermal expansion between $2.5 \times 10^{-6} K^{-1}$ and $3.5 \times 10^{-6} K^{-1}$ approximately, and attachable to one of the objects, and a device for scanning the scale and attachable to the other of the objects.

6 Claims, 2 Drawing Sheets

LINEAR ENCODER

This is a continuation of application Ser. No. 08/264,538, filed Mar. 23, 1994 now abandoned.

BACKGROUND OF THE INVENTION

The present invention relates to a position measuring device, in particular, a linear encoder for measuring a relative position of two objects and including a scale attachable to one of the objects, and a device for scanning the scale and attachable to the other of the objects.

Such a linear encoder can be used, for example, for measuring a relative linear position of two machine-tool parts, such as machine-tool bed and machine-tool slide. In order to insure a very precise measurement, the scale is generally embedded in a hollow housing, with the scanning device being located in the same housing.

With such very precise encoders, the selection of material is very important, because materials which have different coefficients of thermal expansion need be combined. For different reasons, only on rare occasions, materials which have the same or similar coefficients of thermal expansion can be used. Commonly, as disclosed in European Patent No. 0.118 607, when steel workpieces are to be machined, materials such as gray cast iron (machine-tool parts), aluminum (hollow-housing) and steel or glass (the scale), are combined.

European Patent No. 0.118 607 and European Patent Application No. 0.202 630 also disclose using a scale formed of a material the coefficient of thermal expansion of which is close to zero as much as possible. The two European patents disclose suitable materials for producing scales.

It is also known to connect a scale and a scale support with a possibility of their relative longitudinal displacement, by using a highly elastic intermediate layer. Therefore, the length change of the support, which is caused by bending of the support, does not affect the scale. The connection of a scale to a support by an intermediate, highly elastic layer is disclosed in German Patent No. 1,176,382.

U.S. Pat. No. 3,816,002 discloses a linear encoder the housing of which is secured on a slide of a machine-tool. The scale is secured, inside the housing, at its one end, with the other end of the scale being positioned inside the housing by means of a tensioning device. The tensioning spring device compensates for the temperature-induced length change. Due to the use of such a tensioning device, the length change of the housing does not affect the scale, and the scale length is changed according to its own coefficient of thermal expansion. However, this can result in a measurement error.

Accordingly, the connection of a scale to a support by a highly elastic layer can only then be used when a temperature-induced error is taken into account. For the determination of this influence parameter, complex error compensation calculations have to be conducted.

Accordingly, the object of the invention is to provide a linear encoder without the above-discussed drawbacks and in which the adverse temperature influence is eliminated, and the error correction calculations can be dispensed with.

SUMMARY OF THE INVENTION

The object of the invention is achieved by providing a linear encoder the scale of which has a coefficient of thermal expansion between $2.5 \times 10^{-6} K^{-1}$ and $3.5 \times 10^{-6} K^{-1}$ approximately.

The important advantage of the linear encoder, according to the present invention, consists in that the scale length, during machining of a workpiece, changes to the same extent as the length of the workpiece.

BRIEF DESCRIPTION OF THE DRAWINGS

The objects and features of the present invention will become more apparent, and the invention itself will be best understood, from the following detailed description of the preferred embodiments when read with reference to the accompanying drawings, wherein.

DETAILED DESCRIPTION OF PREFERRED EMBODIMENTS

Figure 1:
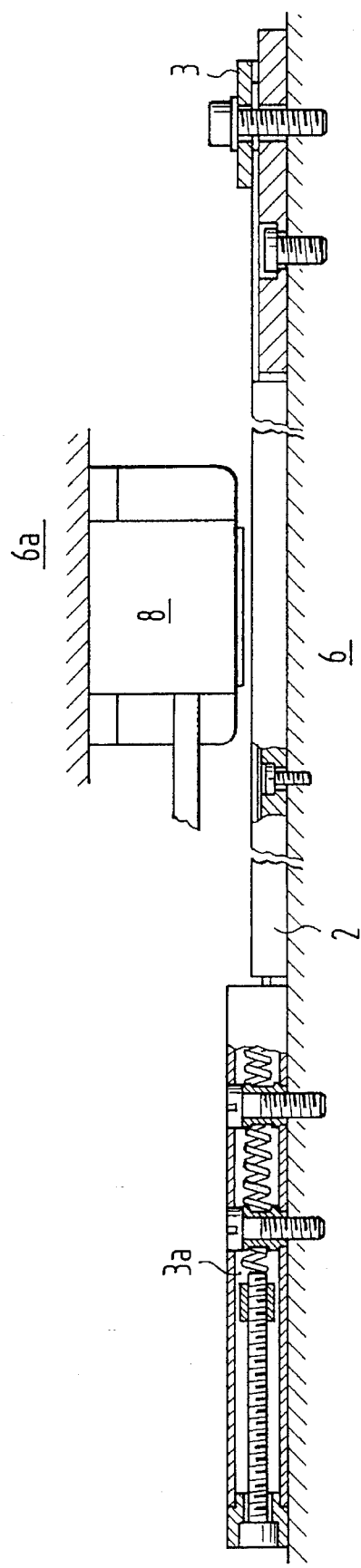
FIG. 1 is a partially cross-sectional longitudinal view of a linear encoder according to the present invention.

FIG. 1 shows a so-called exposed linear encoder having its scale carrier element (2) secured to a machine-tool part (6). A scale carrier (1), formed as a flexible scale tape, is inserted into a longitudinal groove (not shown in detail) provided in the carrier element (2). At one of its opposite ends, the scale carrier (1) is fixedly secured to the machine-tool part (6) by virtue of the scale carrier element (2) being secured to the part (6) by a clamp (3). The other of the opposite ends of the scale carrier (1) is engaged by a tensioning device (3a) which retains the flexible scale carrier with a precisely calculated tension force. The tensioning device (3) is secured to the machine-tool part (6) with screws. A scanning device (8) is secured on another machine-tool part (6a) and scans the scale carrier (1) when the two machine-tool parts (6) and (6a) move relative to each other.

The tape-shaped scale carrier (1) is made of a special alloy having a coefficient of thermal expansion between $2.5 \times 10^{-6} K^{-1}$ and $3.5 \times 10^{-6} K^{-1}$. The coefficient of thermal expansion of such scale carrier (1) is so selected that the thermal expansion of the scale carrier, which is caused by operational temperatures, practically corresponds to that of the material of the machined stock.

Thereby, the operation-induced length change of the scale carrier (1) is equal to the length change of the workpiece, and the tensioning device (3a) compensates the length change of the machine-tool part (6). The tensioning device is so dimensioned that the tensioning force, acting on the scale carrier (1), does not cause an inadmissible extension of the scale carrier. All these measures insure that all measurements effected during operation of the machine-tool are always based on a sufficiently precise measurement basis.

Figure 2:
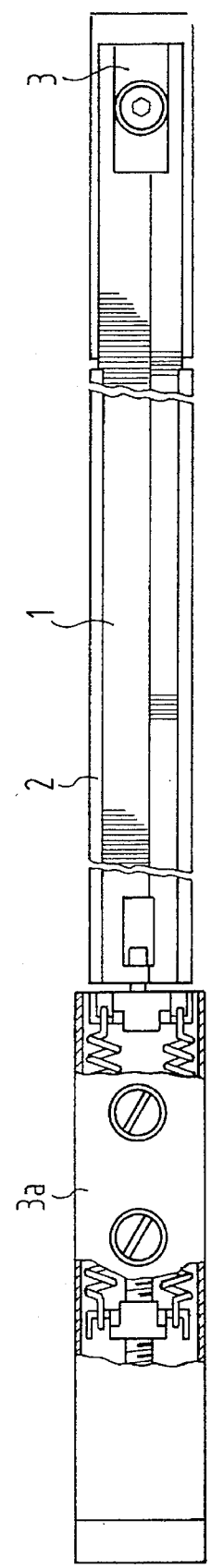
FIG. 2 is a plan view of the linear encoder shown in FIG. 1.

FIG. 2 shows a plan view of the inventive encoder and in which the separate elements of the encoder, such as the scale carrier (1), the scale carrier element (2), the clamp (3), and the tensioning device (3a) can be distinguished.

Figure 3:
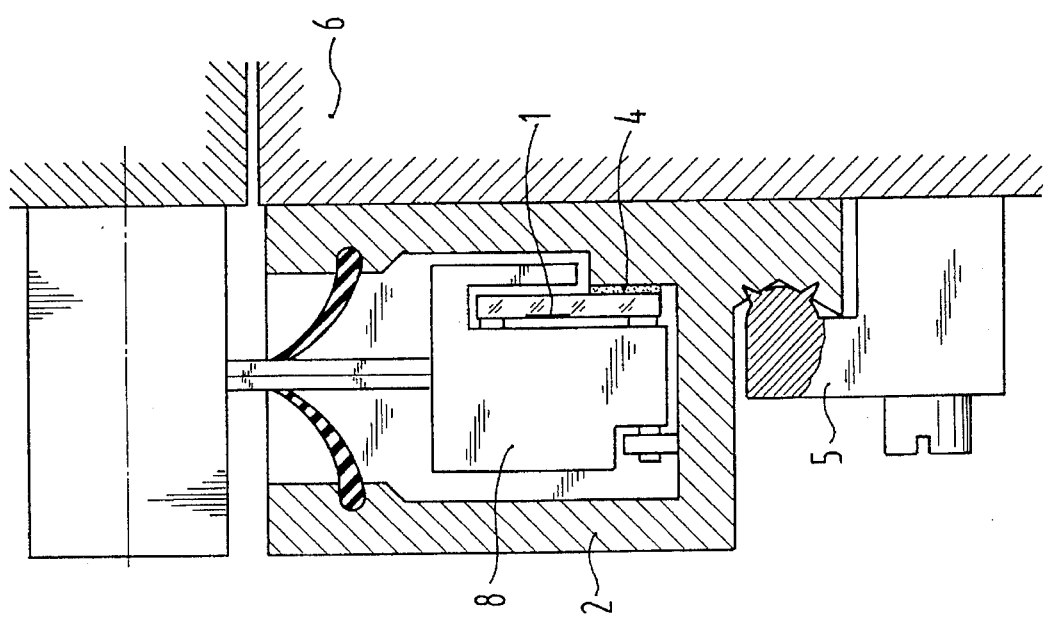
FIG. 3 is a transverse cross-sectional view of another embodiment of a linear encoder according to the present invention.

The linear encoder shown in FIG. 3 has a scale carrier (1) formed of glass, ceramics or other material, the coefficient of thermal expansion of which lies in the above-mentioned range. This material is known under the name of PYREX™, which is a trademark of Corning Incorporated, Corning, N.Y. 14831. The attachment of scale carrier (1) in this encoder is effected with a highly elastic glue (4). The scale carrier (1) is, in this case, attached to an inner surface of a housing (2), which serves as a scale carrier element. With a uniform temperature change along the entire measurement length, this connection means provides the same characteristics as if the scale carrier was rigidly connected with the housing (2) in its center. The housing (2) (the scale carrier element) can uniformly expand from the center in the measurement direction, so that only negligible tension is generated in the scale carrier (1) and its length changes very slightly. The attachment of the housing (2) to a machine-tool part, the relative movement of which is to be measured, is effected with tension claws (5).

Figure 4:
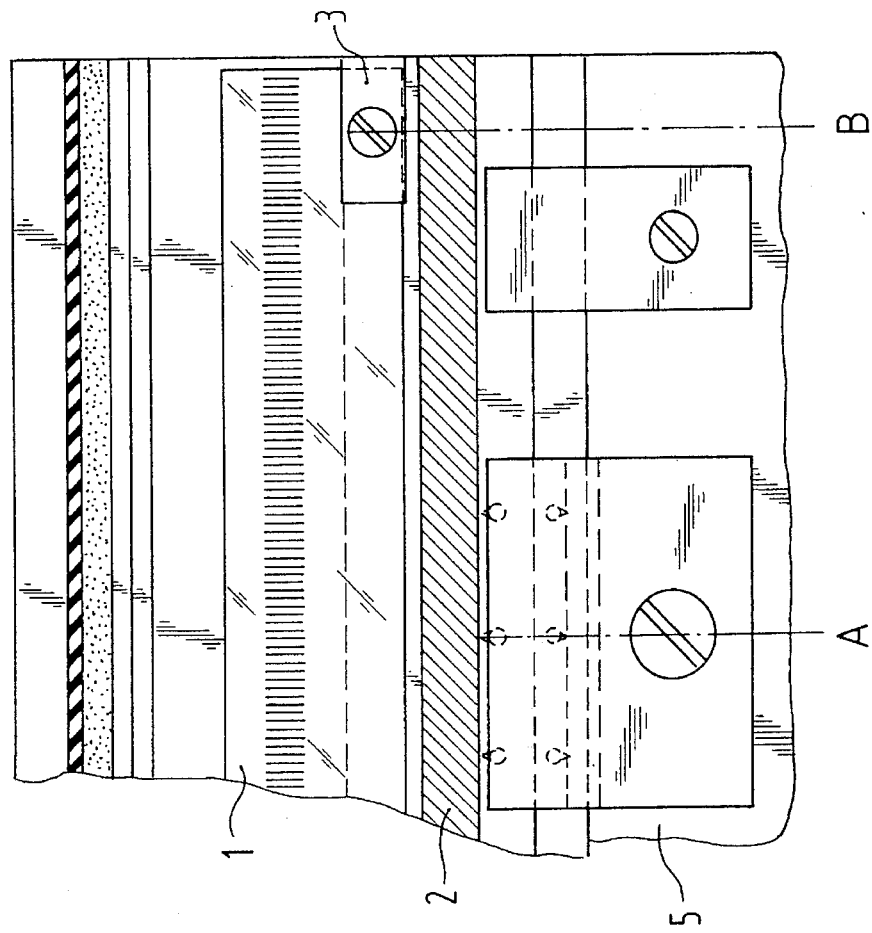
FIG. 4 is a cross-sectional view of a portion of the linear encoder shown in FIG. 3.

FIG. 4 shows another way of attaching the scale carrier. Here, the scale carrier is attached, at its end, to the housing (2) with a clamp (3) with the remaining portion of the scale carrier (1) being attached to the housing (2) with highly elastic glue (4). In this case, the housing (2) can expand or contract, with the temperature change, without any impediment.

As in the case of FIG. 3, the housing (2) is attached to the corresponding machine-tool part (6) with tension claws (5). By a predetermined selection of the position of the connection points A and B of the scale carrier (1) on the housing (2), and of the housing (2) on the machine-tool part (6), a predetermined temperature compensation of the length change of the machine-tool part (6), which is caused by operational temperatures, can be achieved, with appropriate allowance for the coefficients of thermal expansion of the housing (2) and the machine-tool part (6).

The scale carrier (1) can itself be formed as a scale; however, it should not constitute a connection element of a scale carrier and a scale carrier element. In this case, the scale (1) can be made of the same material which is to be machined. For example, if a material to be machined is a monocrystalin silicium, the scale is also made of a monocrystalin silicium. Thus, with a temperature change, the scale length changes to the same extent as that of the machined workpiece.

While the present invention was shown and described with reference to the preferred embodiment, various modifications thereof will be apparent to those skilled in the art and, therefore, it is not intended that the invention be limited to the disclosed embodiments or to the details thereof, and departures may be made therefrom within the spirit and scope of the invention as defined in the appended claims.

What is claimed is:

1. A linear encoder for use in a machine for manufacturing workpieces having a coefficient of thermal expansion approximately between $2.5 \times 10^{-6}$ K$^{-1}$ and $3.5 \times 10^{-6}$ K$^{-1}$, the machine having two movable relative to each other objects, said linear encoder being designed for measuring a relative position of the two objects, and said linear encoder comprising a scale having a coefficient of thermal expansion approximately between $2.5 \times 10^{-6}$ K$^{-1}$ and $3.5 \times 10^{-6}$ K$^{-1}$, selected to substantially correspond to the coefficient of thermal expansion of the workpieces to be manufactured on the machine, said scale being attachable to one of the two objects, and a device for scanning said scale and attachable to another of the two objects.

2. A linear encoder as set forth in claim 1, wherein the scale is formed of one of monocrystaline silicium, glass, and glass-ceramics.

3. A linear encoder as set forth in claim 1, wherein the scale comprises a unit formed of a scale carrier and a scale carrier element.

4. A linear encoder as set forth in claim 3, wherein the scale carrier is attached to the scale carrier element with a highly elastic glue.

5. A linear encoder as set forth in claim 3, wherein the scale carrier is fixedly attached to the scale carrier element at one point.

6. A linear encoder as set forth in claim 3, further comprising a tensioning device for connecting one end of the scale carrier to the scale carrier element.

* * * * *